United States Patent
Xu et al.

(10) Patent No.: US 11,888,611 B2
(45) Date of Patent: Jan. 30, 2024

(54) RESOLUTION OF DUPLEX MODE CONFLICTS

(71) Applicant: QUALCOMM Incorporated, San Diego, CA (US)

(72) Inventors: Huilin Xu, Temecula, CA (US); Muhammad Sayed Khairy Abdelghaffar, San Jose, CA (US); Ahmed Attia Abotabl, San Diego, CA (US); Krishna Kiran Mukkavilli, San Diego, CA (US); Hwan Joon Kwon, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/303,119

(22) Filed: May 20, 2021

(65) Prior Publication Data

US 2021/0409148 A1   Dec. 30, 2021

Related U.S. Application Data

(60) Provisional application No. 63/045,550, filed on Jun. 29, 2020.

(51) Int. Cl.
*H04L 1/00* (2006.01)
*H04L 5/14* (2006.01)
*H04W 72/53* (2023.01)

(52) U.S. Cl.
CPC .............. *H04L 1/0025* (2013.01); *H04L 5/14* (2013.01); *H04W 72/53* (2023.01)

(58) Field of Classification Search
CPC ..................................................... H04L 1/0025
See application file for complete search history.

(56) References Cited

U.S. PATENT DOCUMENTS

| 2007/0183349 A1 | 8/2007 | Pannell et al. |
| 2021/0136771 A1* | 5/2021 | Xu ............... H04W 72/53 |

FOREIGN PATENT DOCUMENTS

| EP | 1999882 A1 | 12/2008 |
| GB | 2355373 A | 4/2001 |

OTHER PUBLICATIONS

International Search Report and Written Opinion—PCT/US2021/070594—ISA/EPO—dated Sep. 14, 2021.

* cited by examiner

*Primary Examiner* — Abdeltif Ajid
(74) *Attorney, Agent, or Firm* — Harrity & Harrity, LLP (57) ABSTRACT

Various aspects of the present disclosure generally relate to wireless communication. In some aspects, a user equipment may determine that there is a duplex mode conflict among control resource sets (CORESETs), among search space (SS) sets, or among one or more CORESETs and one or more SS sets, select a duplex mode based at least in part on one or more conflict rules after determining that there is a duplex mode conflict, and communicate with a base station using the duplex mode. Numerous other aspects are provided.

28 Claims, 7 Drawing Sheets

500 →

530
Determine that there is duplex mode conflict among control resource sets (CORESETs), among search space (SS) sets, or among CORESETs and SS sets 535
Select duplex mode based at least in part on conflict rules after determining that there is duplex mode conflict 540
Determine that there is duplex mode conflict among CORESETs, among SS sets, or among CORESETs and SS sets 545
Select duplex mode based at least in part on conflict rules after determining that there is duplex mode conflict 550
Communicate using duplex mode

RESOLUTION OF DUPLEX MODE CONFLICTS

CROSS-REFERENCE TO RELATED APPLICATION

This patent application claims priority to U.S. Provisional Patent Application No. 63/045,550, filed on Jun. 29, 2020, entitled "RESOLUTION OF DUPLEX MODE CONFLICTS," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for resolution of duplex mode conflicts.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, or a 5G Node B.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE, NR, and other radio access technologies.

SUMMARY

In some aspects, a method of wireless communication performed by a UE may include determining that there is a duplex mode conflict among control resource sets (CORESETs), among search space (SS) sets, or among one or more CORESETs and one or more SS sets. The method may include selecting a duplex mode based at least in part on one or more conflict rules after determining that there is a duplex mode conflict, and communicating with a base station using the duplex mode.

In some aspects, a method of wireless communication performed by a base station may include determining that there is a duplex mode conflict among CORESETs, among SS sets, or among one or more CORESETs and one or more SS sets. The method may include selecting a duplex mode based at least in part on one or more conflict rules after determining that there is a duplex mode conflict, and communicating with a UE using the duplex mode.

In some aspects, a UE for wireless communication may include a memory and one or more processors coupled to the memory. The one or more processors may be configured to determine that there is a duplex mode conflict among CORESETs, among SS sets, or among one or more CORESETs and one or more SS sets. The one or more processors may be configured to select a duplex mode based at least in part on one or more conflict rules after determining that there is a duplex mode conflict, and communicate with a base station using the duplex mode.

In some aspects, a base station for wireless communication may include a memory and one or more processors coupled to the memory. The one or more processors may be configured to determine that there is a duplex mode conflict among CORESETs, among SS sets, or among one or more CORESETs and one or more SS sets. The one or more processors may be configured to select a duplex mode based at least in part on one or more conflict rules after determining that there is a duplex mode conflict, and communicate with a UE using the duplex mode.

In some aspects, a non-transitory computer-readable medium storing a set of instructions for wireless communication may include one or more instructions that, when executed by one or more processors of a UE, cause the UE to determine that there is a duplex mode conflict among CORESETs, among SS sets, or among one or more CORESETs and one or more SS sets, select a duplex mode based at least in part on one or more conflict rules after determining that there is a duplex mode conflict, and communicate with a base station using the duplex mode.

In some aspects, a non-transitory computer-readable medium storing a set of instructions for wireless communication may include one or more instructions that, when executed by one or more processors of a base station, cause the base station to determine that there is a duplex mode conflict among CORESETs, among SS sets, or among one or more CORESETs and one or more SS sets, select a duplex mode based at least in part on one or more conflict rules after determining that there is a duplex mode conflict, and communicate with a UE using the duplex mode.

In some aspects, an apparatus for wireless communication may include means for determining that there is a duplex mode conflict among CORESETs, among SS sets, or among one or more CORESETs and one or more SS sets, means for selecting a duplex mode based at least in part on one or more conflict rules after determining that there is a duplex mode conflict, and means for communicating with a base station using the duplex mode.

In some aspects, an apparatus for wireless communication may include means for determining that there is a duplex mode conflict among CORESETs, among SS sets, or among one or more CORESETs and one or more SS sets, means for selecting a duplex mode based at least in part on one or more conflict rules after determining that there is a duplex mode conflict, and means for communicating with a user equipment using the duplex mode.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
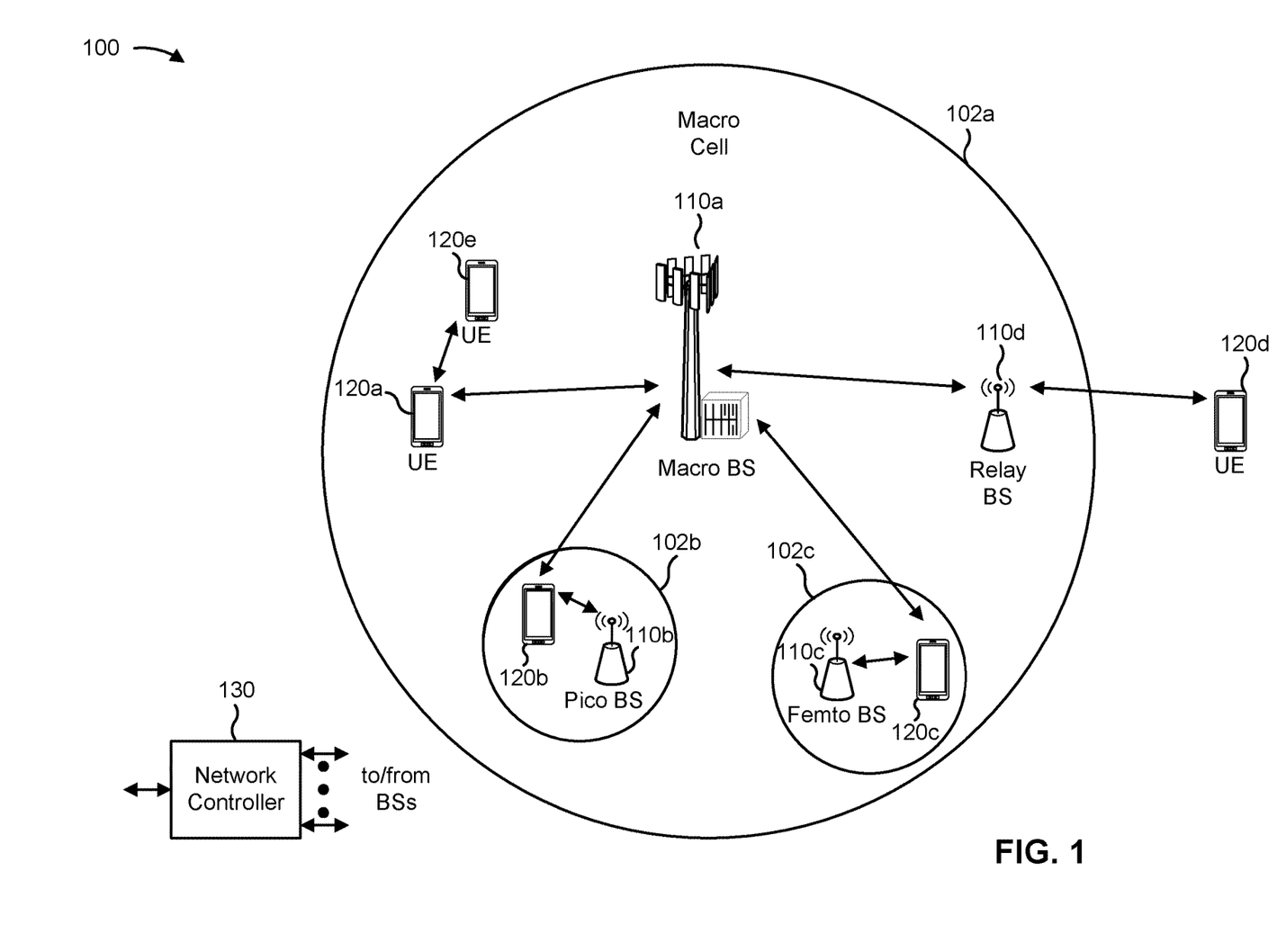
FIG. 1 is a diagram illustrating an example of a wireless network, in accordance with the present disclosure.

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and/or a frequency channel Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
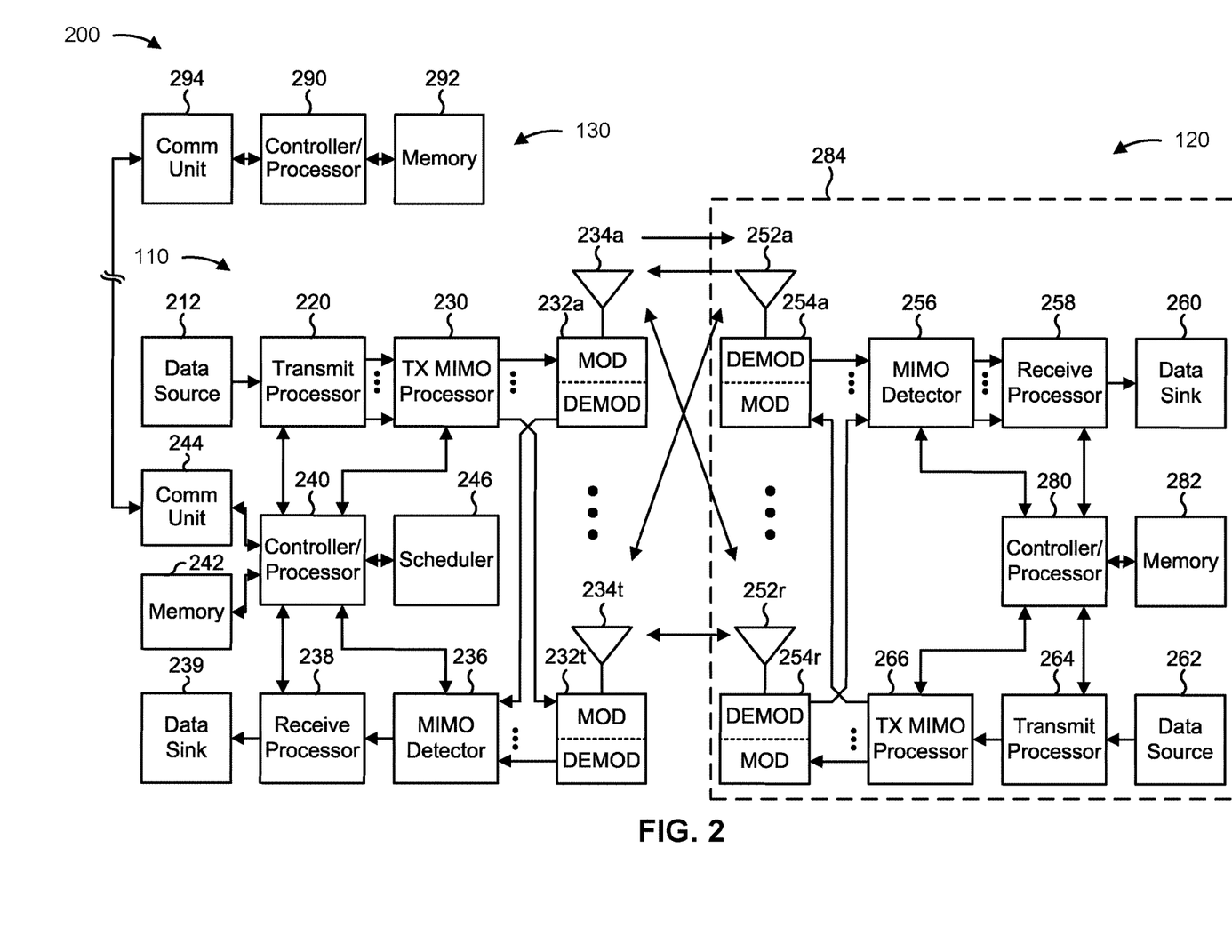
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS), a demodulation reference signal (DMRS)) and synchronization signals (e.g., the primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), and/or CQI, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-7).

Controller/processor 240 of base station 110, controller/processor 280 of UE 120, and/or any other component(s) of FIG. 2 may perform one or more techniques associated with resolving duplex mode conflicts, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of base station 110 and/or UE 120, may cause the one or more processors, UE 120, and/or base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, UE 120 may include means for determining that there is a duplex mode conflict among control resource sets (CORESETs), among search space (SS) sets, or among one or more CORESETs and one or more SS sets, means for selecting a duplex mode based at least in part on one or more conflict rules after determining that there is a duplex mode conflict, and/or means for communicating with a base station using the duplex mode. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

In some aspects, base station 110 may include means for determining that there is a duplex mode conflict among CORESETs, among SS sets, or among one or more CORESETs and one or more SS sets, means for selecting a duplex mode based at least in part on one or more conflict rules after determining that there is a duplex mode conflict, and/or means for communicating with a UE using the duplex mode. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, and/or antenna 234.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
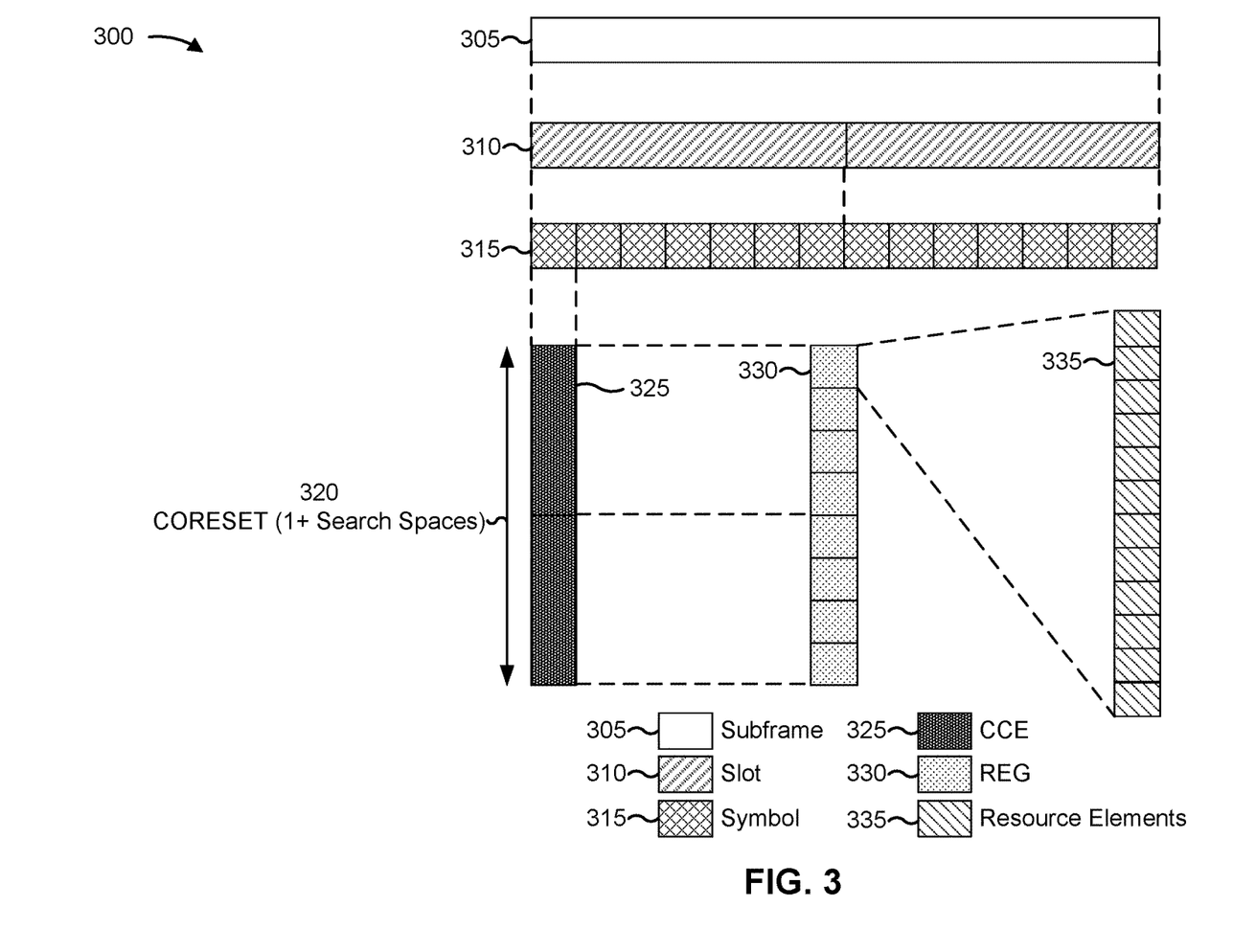
FIG. 3 is a diagram illustrating an example resource structure for wireless communication, in accordance with the present disclosure.

FIG. 3 is a diagram illustrating an example resource structure 300 for wireless communication, in accordance with the present disclosure. Resource structure 300 shows an example of various groups of resources described herein. As shown, resource structure 300 may include a subframe 305. Subframe 305 may include multiple slots 310. While resource structure 300 is shown as including 2 slots per subframe, a different number of slots may be included in a subframe (e.g., 4 slots, 8 slots, 16 slots, 32 slots). In some aspects, different types of transmission time intervals (TTIs) may be used, other than subframes and/or slots. A slot 310 may include multiple symbols 315, such as 14 symbols per slot.

The potential control region of a slot 310 may be referred to as a CORESET 320 and may be structured to support an efficient use of resources, such as by flexible configuration or reconfiguration of resources of the CORESET 320 for one or more PDCCHs, one or more physical downlink shared channels (PDSCHs), and/or the like. In some aspects, the CORESET 320 may occupy the first symbol 315 of a slot 310, the first two symbols 315 of a slot 310, or the first three symbols 315 of a slot 310. Thus, a CORESET 320 may include multiple resource blocks (RBs) in the frequency domain, and either one, two, or three symbols 315 in the time domain. In 5G, a quantity of resources included in a CORESET 320 may be flexibly configured, such as by using radio resource control (RRC) signaling to indicate a frequency domain region (e.g., a quantity of resource blocks) and/or a time domain region (e.g., a quantity of symbols) for CORESET 320.

As illustrated, a symbol 315 that includes a CORESET 320 may include one or more control channel elements (CCEs) 325, shown as two CCEs 325 as an example, that span a portion of the system bandwidth. A CCE 325 may include downlink control information (DCI) that is used to provide control information for wireless communication. A base station may transmit DCI during multiple CCEs 325 (as shown), where the quantity of CCEs 325 used for transmission of DCI represents the aggregation level (AL) used by the BS for the transmission of DCI. In FIG. 3, an aggregation level of two is shown as an example, corresponding to two CCEs 325 in a slot 310. In some aspects, different aggregation levels may be used, such as 1, 2, 4, 8, and/or 16.

Each CCE 325 may include a fixed quantity of resource element groups (REGs) 330, shown as 6 REGs 330, or may include a variable quantity of REGs 330. In some aspects, the quantity of REGs 330 included in a CCE 325 may be specified by an REG bundle size. An REG 330 may include one resource block, which may include 12 resource elements (REs) 335 within a symbol 315. A resource element 335 may occupy one subcarrier in the frequency domain and one OFDM symbol in the time domain.

A search space may include all possible locations (e.g., in time and/or frequency) where a PDCCH may be located. A CORESET 320 may include one or more search spaces, such as a UE-specific search space, a group-common search space, and/or a common search space. A search space may indicate a set of CCE locations where a UE may find PDCCHs that can potentially be used to transmit control information to the UE. The possible locations for a PDCCH may depend on whether the PDCCH is a UE-specific PDCCH (e.g., for a single UE) or a group-common PDCCH (e.g., for multiple UEs), an aggregation level being used, and/or the like. A possible location (e.g., in time and/or frequency) for a PDCCH may be referred to as a PDCCH candidate, and the set of all possible PDCCH locations at an aggregation level may be referred to as a search space. For example, the set of all possible PDCCH locations for a particular UE may be referred to as a UE-specific search space. Similarly, the set of all possible PDCCH locations across all UEs may be referred to as a common search space. The set of all possible PDCCH locations for a particular group of UEs may be referred to as a group-common search space. One or more search spaces across aggregation levels may be referred to as a search space set (SS set).

A CORESET 320 may be interleaved or non-interleaved. An interleaved CORESET 320 may have CCE-to-REG mapping such that adjacent CCEs are mapped to scattered REG bundles in the frequency domain (e.g., adjacent CCEs are not mapped to consecutive REG bundles of the CORESET 320). A non-interleaved CORESET 320 may have a CCE-to-REG mapping such that all CCEs are mapped to consecutive REG bundles (e.g., in the frequency domain) of the CORESET 320.

An SS set may be associated with a single CORESET and may provide configuration information about a periodicity, a slot, and starting symbols of the slot where the PDCCH is transmitted. Multiple CORESETs may be configured to a UE in an active bandwidth part, and each CORESET may be associated with multiple SS sets. A CORESET and SS set pair jointly determines the resources for the UE to receive PDCCH. An SS set type may be defined to indicate a type of the PDCCH. For example, a common SS (CSS) set may include a Type0-PDCCH CSS set for scheduling of system information (e.g., system information block (SIB), SIB1), a Type0A-PDCCH CSS set for scheduling of other system information blocks, a Type1-PDCCH CSS set for random access related procedures, a Type2-PDCCH CSS set for scheduling paging messages, and a Type3-PDCCH CSS set for UE group common DCI. A UE specific SS (UESS) set may be for unicast data scheduling.

As indicated above, FIG. 3 is provided as an example. Other examples may differ from what is described with respect to FIG. 3.

Figure 4:
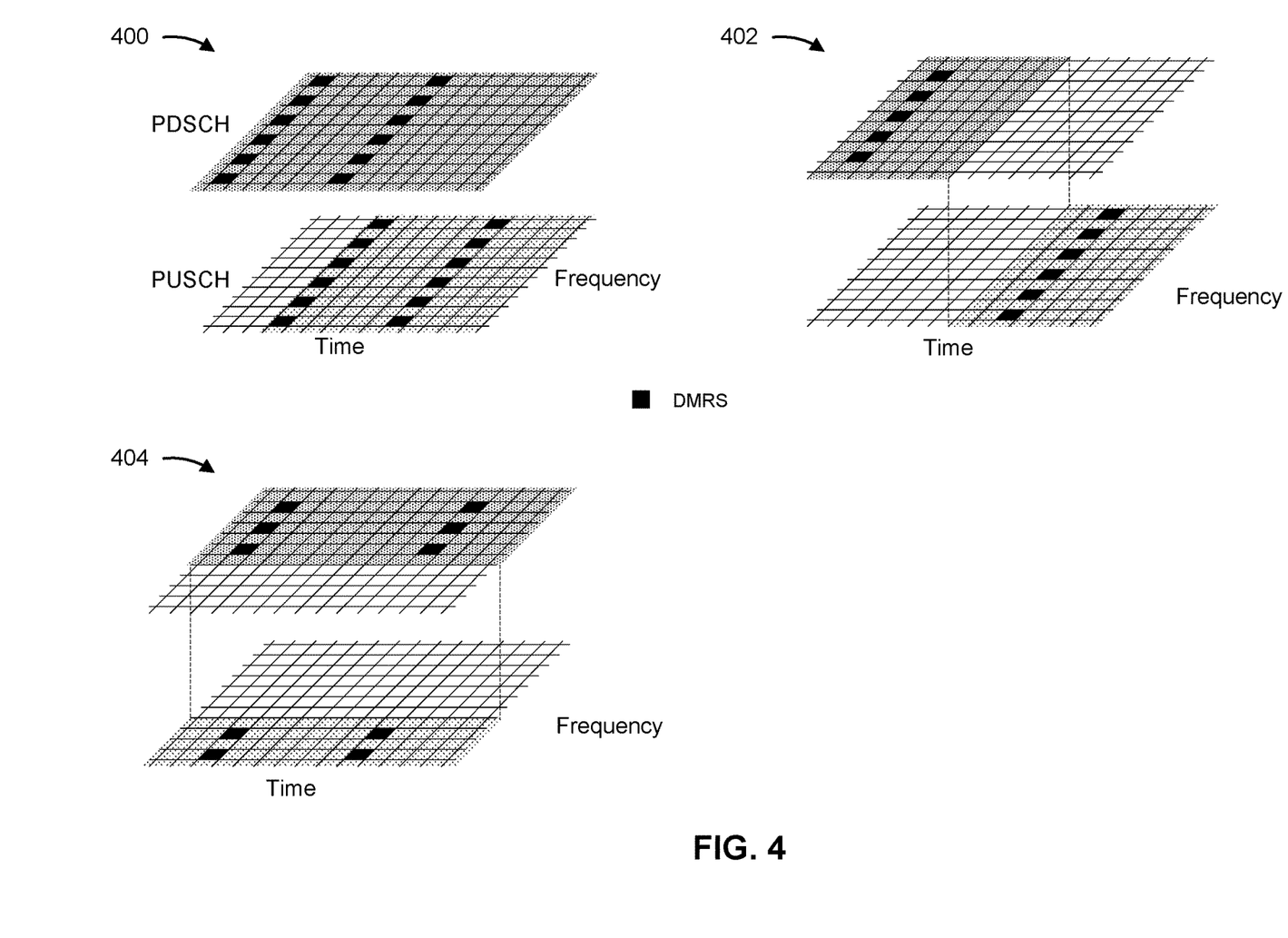
FIG. 4 illustrates examples of associated communications, in accordance with the present disclosure.

FIG. 4 illustrates examples 400, 402, 404 of associated communications, in accordance with the present disclosure.

Some communications may involve an uplink transmission that is associated with a downlink transmission. For example, an uplink communication from a UE may be associated with a downlink communication from a base station, because the uplink communication is transmitted at about the same time as the downlink communication such that some resources of the uplink communication overlap or nearly overlap with resources of the downlink communication. The base station and the UE may be in full duplex mode, where the base station and the UE transmit communications in both directions at the same time, or in half duplex mode, where the base station and the UE take turns transmitting communications.

FIG. 4 shows an example 400 of full duplex mode, an example 402 of time division duplexing (TDD) with no guard time or a narrow (within a threshold size) guard time, and an example 404 of frequency division duplexing (FDD) with no or a narrow guard band. When associated downlink and uplink communications are transmitted in nearby resources, simultaneously or near simultaneously, energy leakage from the uplink communication can cause interference to the downlink communication and vice versa.

At a device (base station or UE), interference may occur from transmission to reception and from reception to transmission. However, interference from transmission to reception is generally much stronger due to transmit power being stronger than receive power. This interference is called self-interference (SI).

As indicated above, FIG. 4 provides some examples. Other examples may differ from what is described with regard to FIG. 4.

A PDCCH may need different levels of protection against SI for different communications. For example, a PDCCH scheduling broadcast information (i.e., system information, paging message) may be more important than a PDCCH scheduling unicast uplink and downlink data. Therefore, different PDCCHs may be scheduled with different duplex modes. A duplex mode for a PDCCH may be defined as full duplex capable (can support PDCCH monitoring in full duplex or half duplex), full duplex only, or half duplex only. For each CORESET or each SS set, a base station may indicate the duplex mode, whether full duplex capable, full duplex only, or half duplex only. However, if the base station indicates one duplex mode for a CORESET and another duplex mode for an SS set that is associated with the CORESET, there is a duplex mode conflict. Duplex mode conflicts may also exist among CORESETs and among SS sets. Duplex mode conflicts may lead to degraded communications, or may lead a base station and a UE to waste time, processing resources and signaling resources using a duplex mode that is not optimal.

According to various aspects described herein, a base station and a UE may use various rules to resolve a duplex mode conflict. In some aspects, for a duplex mode conflict among multiple CORESETs, a UE may determine a duplex mode to use for communications based at least in part on CORESET identifiers (IDs). For example, the UE may determine to use a duplex mode for a CORESET that has the lowest CORESET ID. In some aspects, the UE may determine a duplex mode based at least in part on SS set IDs. For example, the UE may determine to use a duplex mode of an SS set, associated with the CORESET, that has the lowest SS set ID among SS set IDs of all SS sets associated with these CORESETs. As a result, the UE may quickly resolve the duplex mode conflict and proceed with communications according to the determined duplex mode. The base station may operate according to the same conflict rules by which the UE operates. The base station and the UE may conserve time, processing resources, and signaling resources that would otherwise be wasted due to unresolved duplex mode conflicts. Various other rules may be used as described herein.

Figure 5:
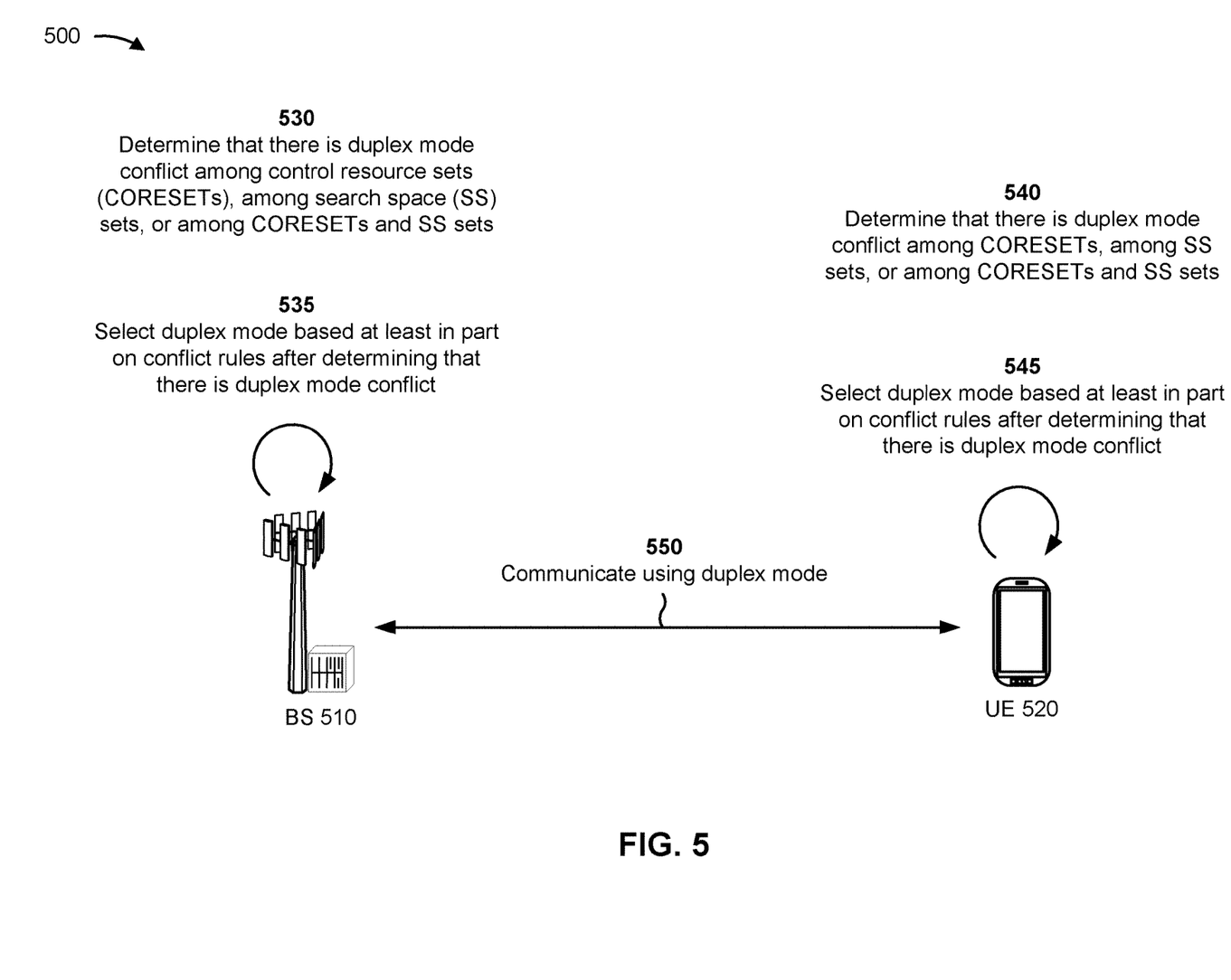
FIG. 5 is a diagram illustrating an example of resolving duplex mode conflicts, in accordance with the present disclosure.

FIG. 5 is a diagram illustrating an example 500 of resolving duplex mode conflicts, in accordance with the present disclosure. FIG. 5 shows a BS 510 (e.g., a BS 110 depicted in FIGS. 1 and 2) and a UE 520 (e.g., a UE 120 depicted in FIGS. 1 and 2) that may communicate with each other. BS 510 and UE 520 may be able to communicate in a full duplex capable mode, a full duplex only mode, or a half duplex only mode.

As shown by reference number 530, BS 510 may determine that there is a duplex mode conflict. There may be different duplex modes among multiple CORESETs, different duplex modes among SS sets, or different duplex modes among CORESETs and multiple SS sets. For example, one PDCCH may be scheduled with a CORESET having a duplex mode of full duplex only, while another PDCCH may be scheduled with a CORESET having a duplex mode of half duplex only.

As shown by reference number 535, BS 510 may select a duplex mode based at least in part on one or more conflict rules after determining that there is a duplex mode conflict. Conflict rules are described further below.

UE 520 may operate according to the same conflict rules as BS 510. As shown by reference number 540, UE 520 may also determine that there is a duplex mode conflict. As shown by reference number 545, UE 520 may select the duplex mode based at least in part on one or more conflict rules, which may be the same (or some of the same) conflict rules used by BS 510 to select the duplex mode.

As shown by reference number 550, BS 510 and UE 520 may communicate using the duplex mode that was selected separately by BS 510 and UE 520. For example, if UE 520 selected full duplex mode for a PDCCH based at least in part on the conflict rules, UE 520 may transmit communications on the PDCCH using full duplex mode with BS 510.

As for the conflict rules mentioned above, there may be conflict rules for resolving a duplex mode conflict among CORESETs. In some aspects, a conflict rule may specify selection of a duplex mode of a CORESET that has a particular CORESET ID. The particular CORESET ID may be the lowest CORESET ID among CORESETs, the highest CORESET ID, a CORESET ID within a range of CORESET IDs, or a specific CORESET ID indicated in stored configuration information or received in a message. In some aspects, a conflict rule may specify selection of a duplex mode of a CORESET associated with an SS set ID that has a particular SS set ID. The particular SS set ID may be the lowest SS set ID among SS set IDs associated with these CORESETs, the highest SS set ID, an SS set ID within a range of SS set IDs, or a specific SS set ID indicated in stored configuration information or received in a message.

There may be conflict rules for resolving a duplex mode conflict among SS sets in the same symbols. In some aspects, conflict rules for SS sets may mirror the conflict rules for CORESETs described above. For example, a conflict rule may specify selection of a duplex mode of an SS set that has a particular SS set ID. The particular SS set ID may be the lowest SS set ID among SS sets, the highest SS set ID, an SS set ID within a range of SS set IDs, or a specific SS set ID indicated in stored configuration information or received in a message. In some aspects, a conflict rule may specify selection of a duplex mode of an SS set associated with a CORESET ID that has a particular CORESET ID. The particular CORESET ID may be the lowest CORESET ID among CORESET IDs associated with these SS sets, the highest CORESET ID, a CORESET ID within a range of CORESET IDs, or a specific CORESET ID indicated in stored configuration information or received in a message.

In some aspects, a conflict rule may prioritize a duplex mode of certain SS set types (e.g., CSS or UESS). In some aspects, a conflict rule may prioritize a duplex mode of certain PDCCH types among conflicting common SS sets (e.g., Type0-PDCCH, Type0A-PDCCH, Type1-PDCCH, Type2-PDCCH, Type3-PDCCH).

In some aspects, a conflict rule may prioritize a duplex mode of SS sets configured with certain AL. For example, a conflict rule may prioritize a duplex mode of an SS set configured with the lowest AL among all conflicting SS sets. In some aspects, a conflict rule may prioritize a duplex mode of an SS set configured with a certain PDCCH code rate. For example, a conflict rule may prioritize a duplex mode of an SS set configured with the lowest code rate among all conflicting SS sets.

In some aspects, a conflict rule may prioritize one duplex mode over another. For example, the conflict rule may specify using full duplex or using half duplex when there is a duplex mode conflict.

There may be conflict rules for resolving a duplex mode conflict among both CORESETs and SS sets. For example, a conflict rule may have multiple steps. In a first step, the conflict rule may specify resolving a duplex mode conflict within a set of conflicting CORESETs (selecting a CORESET duplex mode) and resolving a duplex mode conflict within a set of conflicting SS sets (selecting an SS set duplex mode). In a second step, the conflict rule may specify resolving a conflict between the selected CORESET duplex mode and the selected SS set duplex mode, if conflict still exists between them.

Alternatively, or additionally, in a first step, a conflict rule may specify separately resolving a duplex mode conflict between a CORESET and associated SS sets, and doing so for each CORESET. If there is one SS set conflicting with its associated CORESET, the conflict rule may prioritize a duplex mode of the CORESET or prioritize a duplex mode of the SS set. In a second step, the conflict rule may specify resolving duplex mode conflicts among CORESETs. This may include following conflict rules described above (e.g., lowest CORESET ID). Otherwise, in some aspects, a conflict rule may specify first resolving a duplex mode conflict among SS sets for each CORESET, and then resolving a duplex mode conflict between a CORESET and the selected SS set. By following conflict rules, as described herein, a UE and a base station may quickly resolve duplex mode conflicts and save time and resources.

As indicated above, FIG. 5 is provided as an example. Other examples may differ from what is described with regard to FIG. 5.

Figure 6:
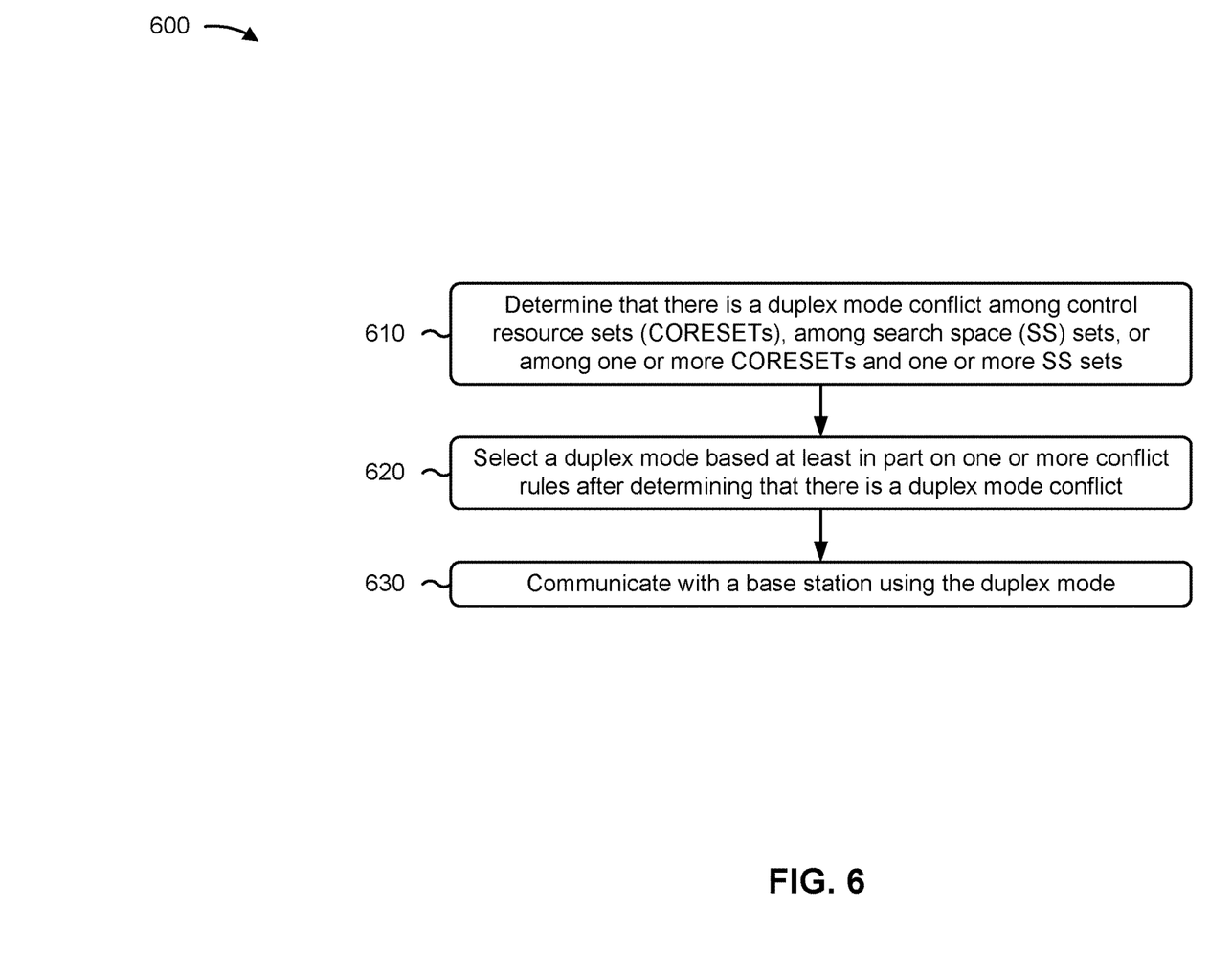
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., a UE 120 depicted in FIGS. 1 and 2, UE 520 depicted in FIG. 5) performs operations associated with resolving duplex mode conflicts.

As shown in FIG. 6, in some aspects, process 600 may include determining that there is a duplex mode conflict among CORESETs, among SS sets, or among one or more CORESETs and one or more SS sets (block 610). For example, the UE (e.g., using receive processor 258, transmit processor 264, controller/processor 280, memory 282) may determine that there is a duplex mode conflict among CORESETs, among SS sets, or among one or more CORESETs and one or more SS sets, as described above.

As further shown in FIG. 6, in some aspects, process 600 may include selecting a duplex mode based at least in part on one or more conflict rules after determining that there is a duplex mode conflict (block 620). For example, the UE (e.g., using receive processor 258, transmit processor 264, controller/processor 280, memory 282) may select a duplex mode based at least in part on one or more conflict rules after determining that there is a duplex mode conflict, as described above.

As further shown in FIG. 6, in some aspects, process 600 may include communicating with a base station using the duplex mode (block 630). For example, the UE (e.g., using receive processor 258, transmit processor 264, controller/processor 280, memory 282) may communicate with a base station using the duplex mode, as described above.

Process 600 may include additional aspects, such as any single aspect or any combination of aspects described below and/or in connection with one or more other processes described elsewhere herein.

In a first aspect, the one or more conflict rules specify that, for a duplex mode conflict among CORESETs, the duplex mode is selected based at least in part on CORESET identifiers for the CORESETs.

In a second aspect, alone or in combination with the first aspect, the one or more conflict rules specify that, for a duplex mode conflict among CORESETs, the duplex mode is selected based at least in part on SS set identifiers of SS sets associated with the CORESETs.

In a third aspect, alone or in combination with one or more of the first and second aspects, the one or more conflict rules specify that full duplex mode is to be used.

In a fourth aspect, alone or in combination with one or more of the first through third aspects, the one or more conflict rules specify that half duplex mode is to be used.

In a fifth aspect, alone or in combination with one or more of the first through fourth aspects, the one or more conflict rules specify that, for a duplex mode conflict among SS sets, the duplex mode is selected based at least in part on SS set identifiers of the SS sets.

In a sixth aspect, alone or in combination with one or more of the first through fifth aspects, the one or more conflict rules specify that, for a duplex mode conflict among SS sets, the duplex mode is selected based at least in part on CORESET identifiers of CORESETs associated with the SS sets.

In a seventh aspect, alone or in combination with one or more of the first through sixth aspects, the one or more conflict rules specify that, for a duplex mode conflict among SS sets, the duplex mode is selected based at least in part on SS set types of the SS sets.

In an eighth aspect, alone or in combination with one or more of the first through seventh aspects, the one or more conflict rules specify that, for a duplex mode conflict among SS sets, the duplex mode is selected based at least in part on physical downlink control channel types of the SS sets.

In a ninth aspect, alone or in combination with one or more of the first through eighth aspects, the one or more conflict rules specify that, for a duplex mode conflict among SS sets, the duplex mode is selected based at least in part on aggregation levels of the SS sets.

In a tenth aspect, alone or in combination with one or more of the first through ninth aspects, the one or more conflict rules specify that, for a duplex mode conflict among SS sets, the duplex mode is selected based at least in part on physical downlink control channel code rates of the SS sets.

In an eleventh aspect, alone or in combination with one or more of the first through tenth aspects, process 600 includes determining a CORESET duplex mode from among the one or more CORESETs based at least in part on the one or more conflict rules, determining an SS set duplex mode from among the one or more SS sets based at least in part on the one or more conflict rules, and selecting the CORESET duplex mode or the SS set duplex mode as the duplex mode based at least in part on the one or more conflict rules.

In a twelfth aspect, alone or in combination with one or more of the first through eleventh aspects, process 600 includes determining, for each of the one or more CORESETs, whether to use a duplex mode of the CORESET or a duplex mode of a particular SS set of the CORESET as a candidate duplex mode, based at least in part on the one or more conflict rules, and selecting the duplex mode from among the one or more candidate duplex modes based at least in part on the one or more conflict rules.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
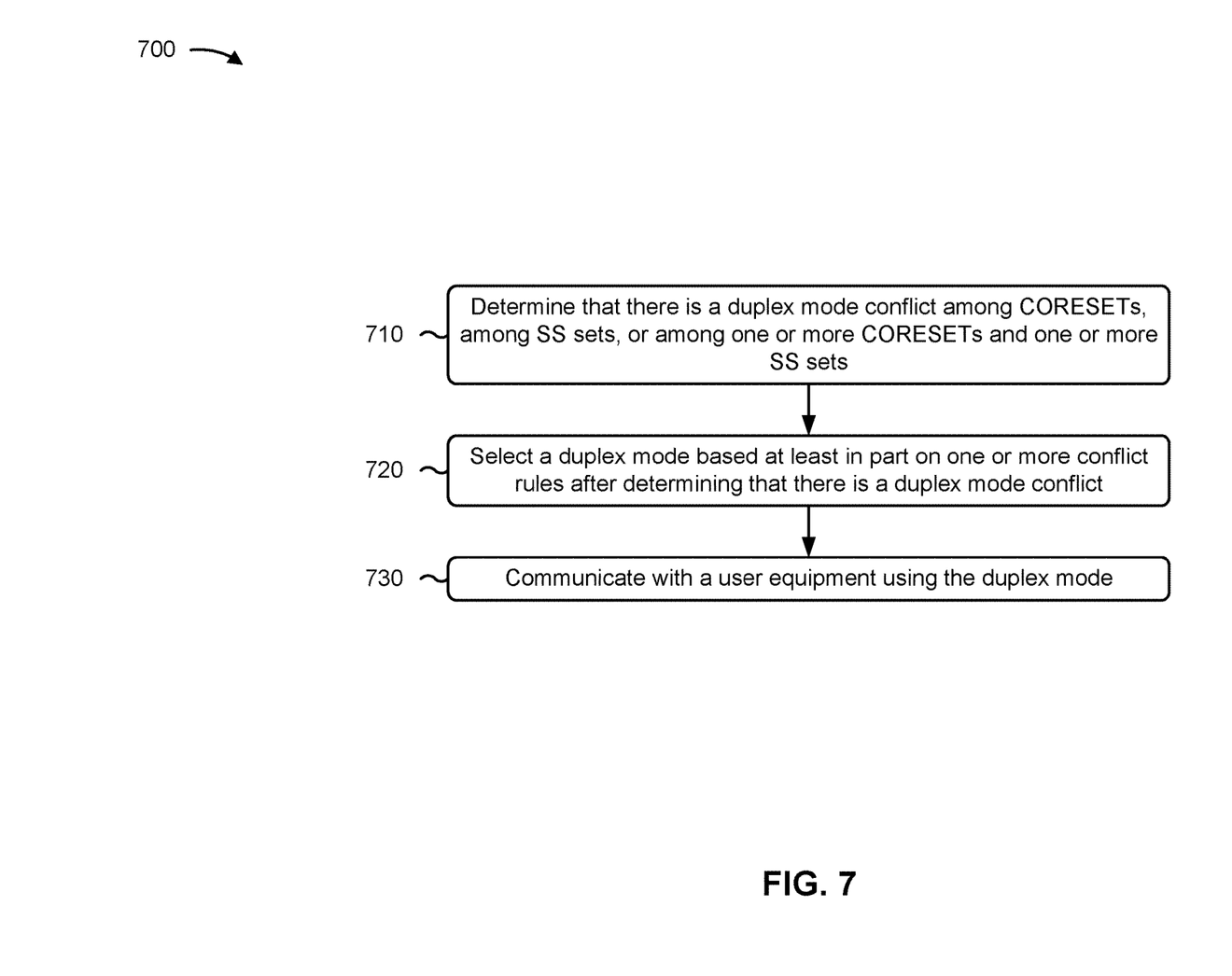
FIG. 7 is a diagram illustrating an example process performed, for example, by a base station, in accordance with the present disclosure.

FIG. 7 is a diagram illustrating an example process 700 performed, for example, by a base station, in accordance with the present disclosure. Example process 700 is an example where the base station (e.g., a base station 110 depicted in FIGS. 1 and 2, BS 510 depicted in FIG. 5) performs operations associated with resolving duplex mode conflicts.

As shown in FIG. 7, in some aspects, process 700 may include determining that there is a duplex mode conflict among CORESETs, among SS sets, or among one or more CORESETs and one or more SS sets (block 710). For example, the base station (e.g., using transmit processor 220, receive processor 238, controller/processor 240, memory 242) may determine that there is a duplex mode conflict among CORESETs, among SS sets, or among one or more CORESETs and one or more SS sets, as described above.

As further shown in FIG. 7, in some aspects, process 700 may include selecting a duplex mode based at least in part on one or more conflict rules after determining that there is a duplex mode conflict (block 720). For example, the base station (e.g., using transmit processor 220, receive processor 238, controller/processor 240, memory 242) may select a duplex mode based at least in part on one or more conflict rules after determining that there is a duplex mode conflict, as described above.

As further shown in FIG. 7, in some aspects, process 700 may include communicating with a user equipment using the duplex mode (block 730). For example, the base station (e.g., using transmit processor 220, receive processor 238, controller/processor 240, memory 242) may communicate with a UE using the duplex mode, as described above.

Process 700 may include additional aspects, such as any single aspect or any combination of aspects described below and/or in connection with one or more other processes described elsewhere herein.

In a first aspect, the one or more conflict rules specify that, for a duplex mode conflict among CORESETs, the duplex mode is selected based at least in part on CORESET identifiers for the CORESETs.

In a second aspect, alone or in combination with the first aspect, the one or more conflict rules specify that, for a duplex mode conflict among CORESETs, the duplex mode is selected based at least in part on SS set identifiers of SS sets associated with the CORESETs.

In a third aspect, alone or in combination with one or more of the first and second aspects, the one or more conflict rules specify that full duplex mode is to be used.

In a fourth aspect, alone or in combination with one or more of the first through third aspects, the one or more conflict rules specify that half duplex mode is to be used.

In a fifth aspect, alone or in combination with one or more of the first through fourth aspects, the one or more conflict rules specify that, for a duplex mode conflict among SS sets, the duplex mode is selected based at least in part on SS set identifiers of the SS sets.

In a sixth aspect, alone or in combination with one or more of the first through fifth aspects, the one or more conflict rules specify that, for a duplex mode conflict among SS sets, the duplex mode is selected based at least in part on CORESET identifiers of CORESETs associated with the SS sets.

In a seventh aspect, alone or in combination with one or more of the first through sixth aspects, the one or more conflict rules specify that, for a duplex mode conflict among SS sets, the duplex mode is selected based at least in part on SS set types of the SS sets.

In an eighth aspect, alone or in combination with one or more of the first through seventh aspects, the one or more conflict rules specify that, for a duplex mode conflict among SS sets, the duplex mode is selected based at least in part on physical downlink control channel types of the SS sets.

In a ninth aspect, alone or in combination with one or more of the first through eighth aspects, the one or more conflict rules specify that, for a duplex mode conflict among SS sets, the duplex mode is selected based at least in part on aggregation levels of the SS sets.

In a tenth aspect, alone or in combination with one or more of the first through ninth aspects, the one or more conflict rules specify that, for a duplex mode conflict among SS sets, the duplex mode is selected based at least in part on physical downlink control channel code rates of the SS sets.

In an eleventh aspect, alone or in combination with one or more of the first through tenth aspects, process 700 includes determining a CORESET duplex mode from among the one or more CORESETs based at least in part on the one or more conflict rules, determining an SS set duplex mode from among the one or more SS sets based at least in part on the one or more conflict rules, and selecting the CORESET duplex mode or the SS set duplex mode as the duplex mode based at least in part on the one or more conflict rules.

In a twelfth aspect, alone or in combination with one or more of the first through eleventh aspects, process 700 includes determining, for each of the one or more CORESETs, whether to use a duplex mode of the CORESET or a duplex mode of a particular SS set of the CORESET as a candidate duplex mode based at least in part on the one or more conflict rules, and selecting the duplex mode from among the one or more candidate duplex modes based at least in part on the one or more conflict rules.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

The following provides an overview of some Aspects of the present disclosure:

Aspect 1: A method of wireless communication performed by a user equipment (UE), comprising: determining that there is a duplex mode conflict among control resource sets (CORESETs), among search space (SS) sets, or among one or more CORESETs and one or more SS sets; selecting a duplex mode based at least in part on one or more conflict rules after determining that there is a duplex mode conflict; and communicating with a base station using the duplex mode.

Aspect 2: The method of Aspect 1, wherein the one or more conflict rules specify that, for a duplex mode conflict among CORESETs, the duplex mode is selected based at least in part on CORESET identifiers for the CORESETs.

Aspect 3: The method of Aspect 1 or 2, wherein the one or more conflict rules specify that, for a duplex mode conflict among CORESETs, the duplex mode is selected based at least in part on SS set identifiers of SS sets associated with the CORESETs.

Aspect 4: The method of any of Aspects 1-3, wherein the one or more conflict rules specify that full duplex mode is to be used.

Aspect 5: The method of any of Aspects 1-3, wherein the one or more conflict rules specify that half duplex mode is to be used.

Aspect 6: The method of any of Aspects 1-5, wherein the one or more conflict rules specify that, for a duplex mode conflict among SS sets, the duplex mode is selected based at least in part on SS set identifiers of the SS sets.

Aspect 7: The method of any of Aspects 1-6, wherein the one or more conflict rules specify that, for a duplex mode conflict among SS sets, the duplex mode is selected based at least in part on CORESET identifiers of CORESETs associated with the SS sets.

Aspect 8: The method of any of Aspects 1-7, wherein the one or more conflict rules specify that, for a duplex mode conflict among SS sets, the duplex mode is selected based at least in part on SS set types of the SS sets.

Aspect 9: The method of any of Aspects 1-8, wherein the one or more conflict rules specify that, for a duplex mode conflict among SS sets, the duplex mode is selected based at least in part on physical downlink control channel types of the SS sets.

Aspect 10: The method of any of Aspects 1-9, wherein the one or more conflict rules specify that, for a duplex mode conflict among SS sets, the duplex mode is selected based at least in part on aggregation levels of the SS sets.

Aspect 11: The method of any of Aspects 1-10, wherein the one or more conflict rules specify that, for a duplex mode conflict among SS sets, the duplex mode is selected based at least in part on physical downlink control channel code rates of the SS sets.

Aspect 12: The method of any of Aspects 1-11, wherein the duplex mode conflict is among one or more CORESETs and one or more SS sets, and wherein selecting the duplex mode includes: determining a CORESET duplex mode from among the one or more CORESETs based at least in part on the one or more conflict rules; determining an SS set duplex mode from among the one or more SS sets based at least in part on the one or more conflict rules; and selecting the CORESET duplex mode or the SS set duplex mode as the duplex mode based at least in part on the one or more conflict rules.

Aspect 13: The method of any of Aspects 1-12, wherein the duplex mode conflict is among one or more CORESETs and one or more SS sets, and wherein selecting the duplex mode includes: determining, for each of the one or more CORESETs, whether to use a duplex mode of the CORESET or a duplex mode of a particular SS set of the CORESET as a candidate duplex mode, based at least in part on the one or more conflict rules; and selecting the duplex mode from among the one or more candidate duplex modes based at least in part on the one or more conflict rules.

Aspect 14: A method of wireless communication performed by a base station, comprising: determining that there is a duplex mode conflict among control resource sets (CORESETs), among search space (SS) sets, or among one or more CORESETs and one or more SS sets; selecting a duplex mode based at least in part on one or more conflict rules after determining that there is a duplex mode conflict; and communicating with a user equipment using the duplex mode.

Aspect 15: The method of Aspect 14, wherein the one or more conflict rules specify that, for a duplex mode conflict among CORESETs, the duplex mode is selected based at least in part on CORESET identifiers for the CORESETs.

Aspect 16: The method of Aspect 14 or 15, wherein the one or more conflict rules specify that, for a duplex mode conflict among CORESETs, the duplex mode is selected based at least in part on SS set identifiers of SS sets associated with the CORESETs.

Aspect 17: The method of any of Aspects 14-16, wherein the one or more conflict rules specify that full duplex mode is to be used.

Aspect 18: The method of any of Aspects 14-16, wherein the one or more conflict rules specify that half duplex mode is to be used.

Aspect 19: The method of any of Aspects 14-18, wherein the one or more conflict rules specify that, for a duplex mode conflict among SS sets, the duplex mode is selected based at least in part on SS set identifiers of the SS sets.

Aspect 20: The method of any of Aspects 14-19, wherein the one or more conflict rules specify that, for a duplex mode conflict among SS sets, the duplex mode is selected based at least in part on CORESET identifiers of CORESETs associated with the SS sets.

Aspect 21: The method of any of Aspects 14-20, wherein the one or more conflict rules specify that, for a duplex mode conflict among SS sets, the duplex mode is selected based at least in part on SS set types of the SS sets.

Aspect 22: The method of any of Aspects 14-21, wherein the one or more conflict rules specify that, for a duplex mode conflict among SS sets, the duplex mode is selected based at least in part on physical downlink control channel types of the SS sets.

Aspect 23: The method of any of Aspects 14-22, wherein the one or more conflict rules specify that, for a duplex mode conflict among SS sets, the duplex mode is selected based at least in part on aggregation levels of the SS sets.

Aspect 24: The method of any of Aspects 14-23, wherein the one or more conflict rules specify that, for a duplex mode conflict among SS sets, the duplex mode is selected based at least in part on physical downlink control channel code rates of the SS sets.

Aspect 25: The method of any of Aspects 14-24, wherein the duplex mode conflict is among one or more CORESETs and one or more SS sets, and wherein selecting the duplex mode includes: determining a CORESET duplex mode from among the one or more CORESETs based at least in part on the one or more conflict rules; determining an SS set duplex mode from among the one or more SS sets based at least in part on the one or more conflict rules; and selecting the CORESET duplex mode or the SS set duplex mode as the duplex mode based at least in part on the one or more conflict rules.

Aspect 26: The method of any of Aspects 14-25, wherein the duplex mode conflict is among one or more CORESETs and one or more SS sets, and wherein selecting the duplex mode includes: determining, for each of the one or more CORESETs, whether to use a duplex mode of the CORESET or a duplex mode of a particular SS set of the CORESET as a candidate duplex mode based at least in part on the one or more conflict rules; and selecting the duplex mode from among the one or more candidate duplex modes based at least in part on the one or more conflict rules.

Aspect 27: An apparatus for wireless communication at a device, comprising a processor; memory coupled with the processor; and instructions stored in the memory and executable by the processor to cause the apparatus to perform the method of one or more of Aspects 1-26.

Aspect 28: A device for wireless communication, comprising a memory and one or more processors coupled to the memory, the memory and the one or more processors configured to perform the method of one or more of Aspects 1-26.

Aspect 29: An apparatus for wireless communication, comprising at least one means for performing the method of one or more of Aspects 1-26.

Aspect 30: A non-transitory computer-readable medium storing code for wireless communication, the code comprising instructions executable by a processor to perform the method of one or more of Aspects 1-26.

Aspect 31: A non-transitory computer-readable medium storing a set of instructions for wireless communication, the set of instructions comprising one or more instructions that, when executed by one or more processors of a device, cause the device to perform the method of one or more of Aspects 1-26.

As used herein, the term "component" is intended to be broadly construed as hardware, firmware, and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware, firmware, and/or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors, coupled to the one or more memories, configured to:
determine that there is a duplex mode conflict, wherein the duplex mode conflict is based at least in part on one or more of:
different duplex modes among multiple control resource sets (CORESETs),
different duplex modes among multiple search space (SS) sets, or
different duplex modes among multiple CORESETs and different duplex modes among multiple SS sets;
select a duplex mode based at least in part on one or more conflict rules after determining that there is the duplex mode conflict; and
communicate with a base station using the selected duplex mode.

2. The UE of claim 1, wherein the one or more conflict rules specify that, for a duplex mode conflict among the multiple CORESETs, the duplex mode is selected based at least in part on CORESET identifiers for the multiple CORESETs.

3. The UE of claim 1, wherein the one or more conflict rules specify that, for a duplex mode conflict among the multiple CORESETs, the duplex mode is selected based at least in part on SS set identifiers of SS sets associated with the multiple CORESETs.

4. The UE of claim 1, wherein the one or more conflict rules specify that full duplex mode is to be used.

5. The UE of claim 1, wherein the one or more conflict rules specify that half duplex mode is to be used.

6. The UE of claim 1, wherein the one or more conflict rules specify that, for a duplex mode conflict among the multiple SS sets, the duplex mode is selected based at least in part on SS set identifiers of the multiple SS sets.

7. The UE of claim 1, wherein the one or more conflict rules specify that, for a duplex mode conflict among the multiple SS sets, the duplex mode is selected based at least in part on CORESET identifiers of the multiple CORESETs associated with the multiple SS sets.

8. The UE of claim 1, wherein the one or more conflict rules specify that, for a duplex mode conflict among the multiple SS sets, the duplex mode is selected based at least in part on SS set types of the multiple SS sets.

9. The UE of claim 1, wherein the one or more conflict rules specify that, for a duplex mode conflict among the multiple SS sets, the duplex mode is selected based at least in part on physical downlink control channel types of the multiple SS sets.

10. The UE of claim 1, wherein the one or more conflict rules specify that, for a duplex mode conflict among the multiple SS sets, the duplex mode is selected based at least in part on aggregation levels of the multiple SS sets.

11. The UE of claim 1, wherein the one or more conflict rules specify that, for a duplex mode conflict among the multiple SS sets, the duplex mode is selected based at least in part on physical downlink control channel code rates of the multiple SS sets.

12. The UE of claim 1, wherein the duplex mode conflict is among multiple CORESETs and multiple SS sets, and wherein the one or more processors, to select the duplex mode, are configured to:
determine a CORESET duplex mode from among the multiple CORESETs based at least in part on the one or more conflict rules;
determine an SS set duplex mode from among the multiple SS sets based at least in part on the one or more conflict rules; and
select the CORESET duplex mode or the SS set duplex mode as the duplex mode based at least in part on the one or more conflict rules.

13. The UE of claim 1, wherein the duplex mode conflict is among multiple CORESETs and multiple SS sets, and wherein the one or more processors, to select the duplex mode, are configured to:
determine, for each of the multiple CORESETs, whether to use a duplex mode of the CORESET or a duplex mode of a particular SS set of the CORESET as a candidate duplex mode, based at least in part on the one or more conflict rules; and
select the candidate duplex mode based at least in part on the one or more conflict rules.

14. A base station for wireless communication, comprising:
one or more memories; and
one or more processors, coupled to the one or more memories, configured to:
determine that there is a duplex mode conflict, wherein the duplex mode conflict is based at least in part on one or more of:
different duplex modes among multiple control resource sets (CORESETs),
different duplex modes among multiple search space (SS) sets, or
different duplex modes among multiple CORESETs and different duplex modes among multiple SS sets;
select a duplex mode based at least in part on one or more conflict rules after determining that there is the duplex mode conflict; and
communicate with a user equipment using the selected duplex mode.

15. The base station of claim 14, wherein the one or more conflict rules specify that, for a duplex mode conflict among the multiple CORESETs, the duplex mode is selected based at least in part on CORESET identifiers for the multiple CORESETs.

16. The base station of claim 14, wherein the one or more conflict rules specify that, for a duplex mode conflict among the multiple CORESETs, the duplex mode is selected at least in part on SS set identifiers of SS sets associated with the multiple CORESETs.

17. The base station of claim 14, wherein the one or more conflict rules specify that full duplex mode is to be used.

18. The base station of claim 14, wherein the one or more conflict rules specify that half duplex mode is to be used.

19. The base station of claim 14, wherein the one or more conflict rules specify that, for a duplex mode conflict among the multiple SS sets, the duplex mode is selected based at least in part on SS set identifiers of the multiple SS sets.

20. The base station of claim 14, wherein the one or more conflict rules specify that, for a duplex mode conflict among the multiple SS sets, the duplex mode is selected based at least in part on CORESET identifiers of CORESETs associated with the multiple SS sets.

21. The base station of claim 14, wherein the one or more conflict rules specify that, for a duplex mode conflict among the multiple SS sets, the duplex mode is selected based at least in part on SS set types of the multiple SS sets.

22. The base station of claim 14, wherein the one or more conflict rules specify that, for a duplex mode conflict among the multiple SS sets, the duplex mode is selected based at least in part on physical downlink control channel types of the multiple SS sets.

23. The base station of claim 14, wherein the one or more conflict rules specify that, for a duplex mode conflict among the multiple SS sets, the duplex mode is selected based at least in part on aggregation levels of the multiple SS sets.

24. The base station of claim 14, wherein the one or more conflict rules specify that, for a duplex mode conflict among the multiple SS sets, the duplex mode is selected based at least in part on physical downlink control channel code rates of the multiple SS sets.

25. The base station of claim 14, wherein the duplex mode conflict is among multiple CORESETs and multiple SS sets, and wherein the one or more processors, to select the duplex mode, are configured to:
   determine a CORESET duplex mode from among the multiple CORESETs based at least in part on the one or more conflict rules;
   determine an SS set duplex mode from among the multiple SS sets based at least in part on the one or more conflict rules; and
   select the CORESET duplex mode or the SS set duplex mode as the duplex mode based at least in part on the one or more conflict rules.

26. The base station of claim 14, wherein the duplex mode conflict is among multiple CORESETs and multiple SS sets, and wherein the one or more processors, to select the duplex mode, are configured to:
   determine, for each of the multiple CORESETs, whether to use a duplex mode of the CORESET or a duplex mode of a particular SS set of the CORESET as a candidate duplex mode based at least in part on the one or more conflict rules; and
   select the candidate duplex mode based at least in part on the one or more conflict rules.

27. A method of wireless communication performed by a user equipment (UE), comprising:
   determining that there is a duplex mode conflict, wherein the duplex mode conflict is based at least in part on one or more of:
      different duplex modes among multiple control resource sets (CORESETs),
      different duplex modes among multiple search space (SS) sets, or
      different duplex modes among multiple CORESETs and different duplex modes among multiple SS sets;
   selecting a duplex mode based at least in part on one or more conflict rules after determining that there is the duplex mode conflict; and
   communicating with a base station using the selected duplex mode.

28. A method of wireless communication performed by a base station, comprising:
   determining that there is a duplex mode conflict, wherein the duplex mode conflict is based at least in part on one or more of:
      different duplex modes among multiple control resource sets (CORESETs),
      different duplex modes among multiple search space (SS) sets, or
      different duplex modes among multiple CORESETs and different duplex modes among multiple SS sets;
   selecting a duplex mode based at least in part on one or more conflict rules after determining that there is the duplex mode conflict; and
   communicating with a user equipment using the selected duplex mode.

* * * * *